(12) United States Patent
Behrendt et al.

(10) Patent No.: US 11,231,283 B2
(45) Date of Patent: Jan. 25, 2022

(54) LOCALIZATION WITH NEURAL NETWORK BASED IMAGE REGISTRATION OF SENSOR DATA AND MAP DATA

(71) Applicant: Robert Bosch GmbH, Stuttgart (DE)

(72) Inventors: Karsten Behrendt, Sunnyvale, CA (US); Mithun Jacob, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 16/258,239

(22) Filed: Jan. 25, 2019

(65) Prior Publication Data

US 2020/0240790 A1 Jul. 30, 2020

(51) Int. Cl.
*G01C 21/32* (2006.01)
*G01S 17/89* (2020.01)
*G06K 9/00* (2006.01)
*G06T 7/11* (2017.01)

(52) U.S. Cl.
CPC ............ *G01C 21/32* (2013.01); *G01S 17/89* (2013.01); *G06K 9/00798* (2013.01); *G06T 7/11* (2017.01); *G06T 2207/30256* (2013.01)

(58) Field of Classification Search
CPC ...... G01C 21/23; G06K 9/00; G06K 9/00798; G06T 7/11; G06T 2207/30256; G01S 17/89
See application file for complete search history.

(56) References Cited

U.S. PATENT DOCUMENTS

| | | | |
|---|---|---|---|
| 7,840,342 B1 | 11/2010 | Breed | |
| 7,983,802 B2 | 7/2011 | Breed | |
| 8,209,120 B2 | 6/2012 | Breed | |
| 8,428,362 B2 | 4/2013 | Miyajima | |
| 8,452,103 B2 * | 5/2013 | Miyajima | ............ G06K 9/6255 382/190 |
| 9,103,671 B1 | 8/2015 | Breed et al. | |
| 9,623,905 B2 | 4/2017 | Shashua et al. | |
| 2009/0030605 A1 | 1/2009 | Breed | |

(Continued)

FOREIGN PATENT DOCUMENTS

| | | |
|---|---|---|
| CN | 105809693 A | 7/2016 |
| CN | 106447707 A | 2/2017 |
| CN | 106780631 A | 5/2017 |

*Primary Examiner* — Tan Q Nguyen
(74) *Attorney, Agent, or Firm* — Maginot, Moore & Beck LLP; Kathy Takeguchi

(57) ABSTRACT

A system and method for localizing an entity includes a processing system with at least one processing device. The processing system is configured to obtain sensor data from a sensor system that includes at least a first set of sensors and a second set of sensors. The processing system is configured to produce a map image with a map region that is selected and aligned based on a localization estimate. The localization estimate is based on sensor data from the first set of sensors. The processing system is configured to extract sets of localization features from the sensor data of the second set of sensors. The processing system is configured to generate visualization images in which each visualization image includes a respective set of localization features. The processing system is configured to generate localization output data for the vehicle in real-time by optimizing an image registration of the map image relative to the visualization images.

18 Claims, 7 Drawing Sheets

(56) References Cited

U.S. PATENT DOCUMENTS

2017/0008521 A1\* 1/2017 Braunstein ......... G01C 21/3407
2017/0026630 A1    1/2017 Chen et al.
2018/0232947 A1\* 8/2018 Nehmadi .............. G01S 17/931
2019/0271550 A1\* 9/2019 Breed .................... G08G 1/147
2020/0202566 A1\* 6/2020 Keserich ................ B60R 11/04

\* cited by examiner

LOCALIZATION WITH NEURAL NETWORK BASED IMAGE REGISTRATION OF SENSOR DATA AND MAP DATA

FIELD

This disclosure relates generally to localization.

BACKGROUND

Localization is a feature that is often provided with high definition maps to assist with navigation and route planning in a number of applications, such as autonomous driving and semi-autonomous driving. In these types of applications, for instance, an inaccuracy or an unsuitable discrepancy between the actual position and the localized position may result in a collision, an unsafe maneuver, a divergence from the destination, etc. In many cases, localization is determined based on global positioning satellite (GPS) data, which may not provide location data with a high level of accuracy in every instance. Also, in the event that the GPS system is malfunctioning or inoperable for a given period of time, then this problem may result in localization output data, which is inaccurate or unavailable for at least that period of time.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a computer implemented method includes obtaining, via a processing system with at least one processing device, sensor data from a sensor system. The sensor data corresponds to a geographic region that includes the vehicle. The method includes generating, via the processing system, a localization estimate for the vehicle based on a first selection of sensor data. The method includes producing, via the processing system, a map image of a mapping region that includes the localization estimate. The method includes extracting, via the processing system, sets of localization features from a second selection of sensor data. The method includes generating, via the processing system, visualization images in which each visualization image includes a respective set of localization features. The method includes generating, via the processing system, localization update data in real-time via optimizing registration of the map image relative to the visualization images. The method includes generating, via the processing system, localization output data based on the localization estimate and the localization update data. The method includes providing, via the processing system, the localization output data to an application system.

In an example embodiment, a system includes a sensor system and a processing system. The sensor system includes a plurality of sensors to sense a geographic region of the vehicle. The processing system is communicatively connected to the sensor system. The processing system includes at least one processing device. The processing system is configured to generate a localization estimate for the vehicle based on a first selection of sensor data from the sensor system. The processing system is configured to produce a map image of a mapping region that includes the localization estimate. The processing system is configured to extract sets of localization features from a second selection of sensor data from the sensor system. The processing system is configured to generate visualization images in which each visualization image includes a respective set of localization features. The processing system is configured to generate localization update data in real-time via optimizing registration of the map image relative to the visualization images. The processing system is configured to generate localization output data based on the localization estimate and the localization update data. The processing system is configured to provide the localization output data to an application system relating to navigation of the vehicle.

In an example embodiment, a computer implemented method comprises producing, via a processing system with at least one processing device, a map image of a mapping region that is aligned with a localization estimate based on a first selection of sensor data. The method includes extracting, via the processing system, sets of localization features from a second selection of sensor data. The sets of localization features include at least a first set of localization features and a second set of localization, features. The method includes generating, via the processing system, visualization images including at least a first visualization image based on the first set of localization features and a second visualization image including the second set of localization features. The method includes generating, via the processing system, localization update data in real-time via optimizing registration of the map image relative to the visualization images. The method includes generating, via the processing system, localization output data based on the localization estimate and the localization update data. The method includes providing, via the processing system, the localization output data to an application system relating to navigation.

These and other features, aspects, and advantages of the present invention are discussed in the following detailed description in accordance with the accompanying drawings throughout which like characters represent similar or like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
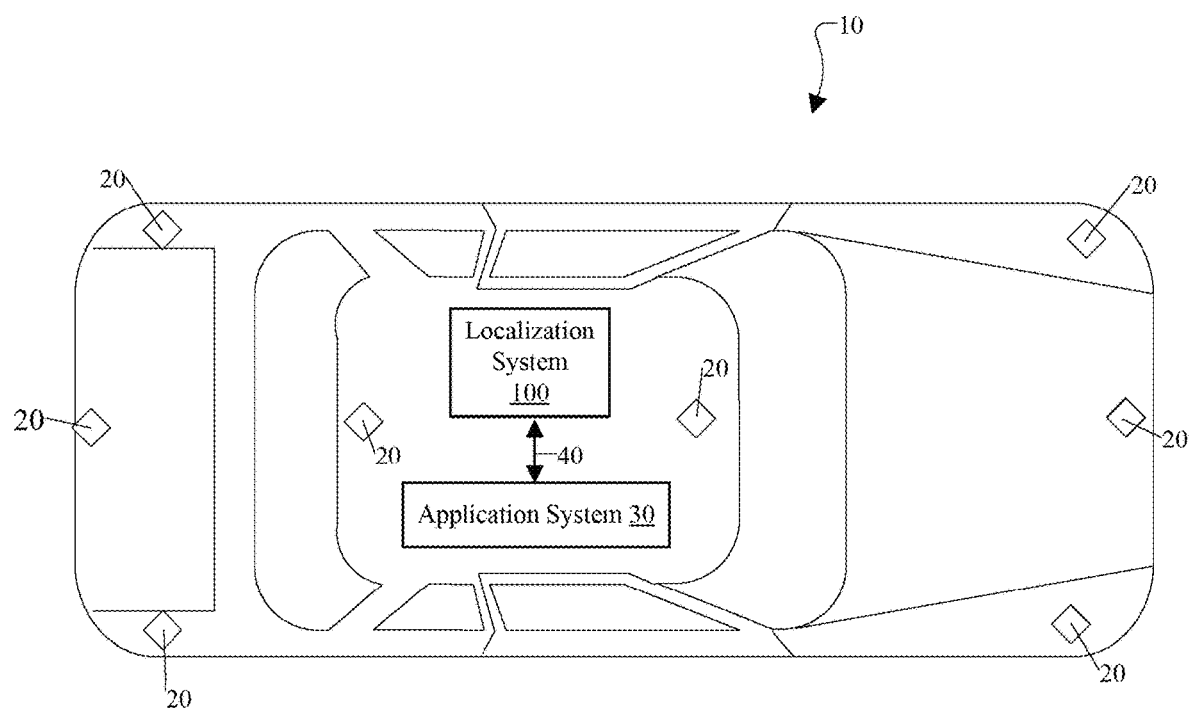
FIG. 1 is a diagram of a non-limiting example of an entity with a localization system according to an example embodiment of this disclosure.

FIG. 1 is a diagram of a vehicle 10 with a system 100 for localization according to an example embodiment. In an example embodiment, the vehicle 10 is configured to be driven autonomously, semi-autonomously, non-autonomously, or any combination thereof. Also, the system 100 includes hardware technology, software technology, or any combination of hardware and software technology. In an example embodiment, the system 100 is advantageous in providing the vehicle 10 with localization output data relating to the vehicle 10 with high-accuracy via various types of sensors 20. Moreover, the system 100 is configured to provide this localization output data in real-time. In an example embodiment, as shown in FIG. 1, the system 100 is configured to communicate with at least one application system 30 via a communication link 40. In an example embodiment, the communication link 40 is any suitable wired or wireless communication technology. Also, as non-limiting examples, the application system 30 includes a navigation system, a route-planning system, a motion control system, or any suitable technological system. In this regard, the processing system 130 is configured to communicate with the application system 30 such that the localization output data contributes to route planning, navigation, motion control, or any suitable application.

In an example embodiment, the system 100 includes a sensor system 120 (FIG. 2A) with one or more sensors 20 at any suitable location of the vehicle 10 such that the sensor system 120 is enabled to provide sensor data to the processing system 130. In this regard, FIG. 1 merely illustrates a conceptual diagram that shows various sensors 20, which are placed at various locations of the vehicle 10 such that these sensors 20 are enabled to sense a current environment of the vehicle 10 in real-time. In an example embodiment, the one or more sensors 20 are configured to capture data relating to the vehicle 10, the environment of the vehicle 10, the location of the vehicle 10, the orientation of the vehicle 10, other relevant information, or any combination thereof. In an example embodiment, upon capturing the data, the one or more sensors 20 are configured to provide the captured data to the appropriate sensor system for processing. For instance, in at least FIGS. 1-2A, the sensor system 120 includes a camera system, a light detection and ranging (LIDAR) system, an optical-based sensor system (e.g. camera system), an odometer system, a radar system, a satellite-based system (e.g., GPS, Galileo, or another satellite-based technology), an inertial measurement unit (IMU), an ultrasonic sensor system, an infrared system, any suitable sensor system, or any combination thereof. In an example embodiment, the sensor data from these sensors 20 are processed by the processing system 130 to generate localization output data, which includes at least position data, orientation data, other localization metrics, or any combination thereof.

Figure 2A:
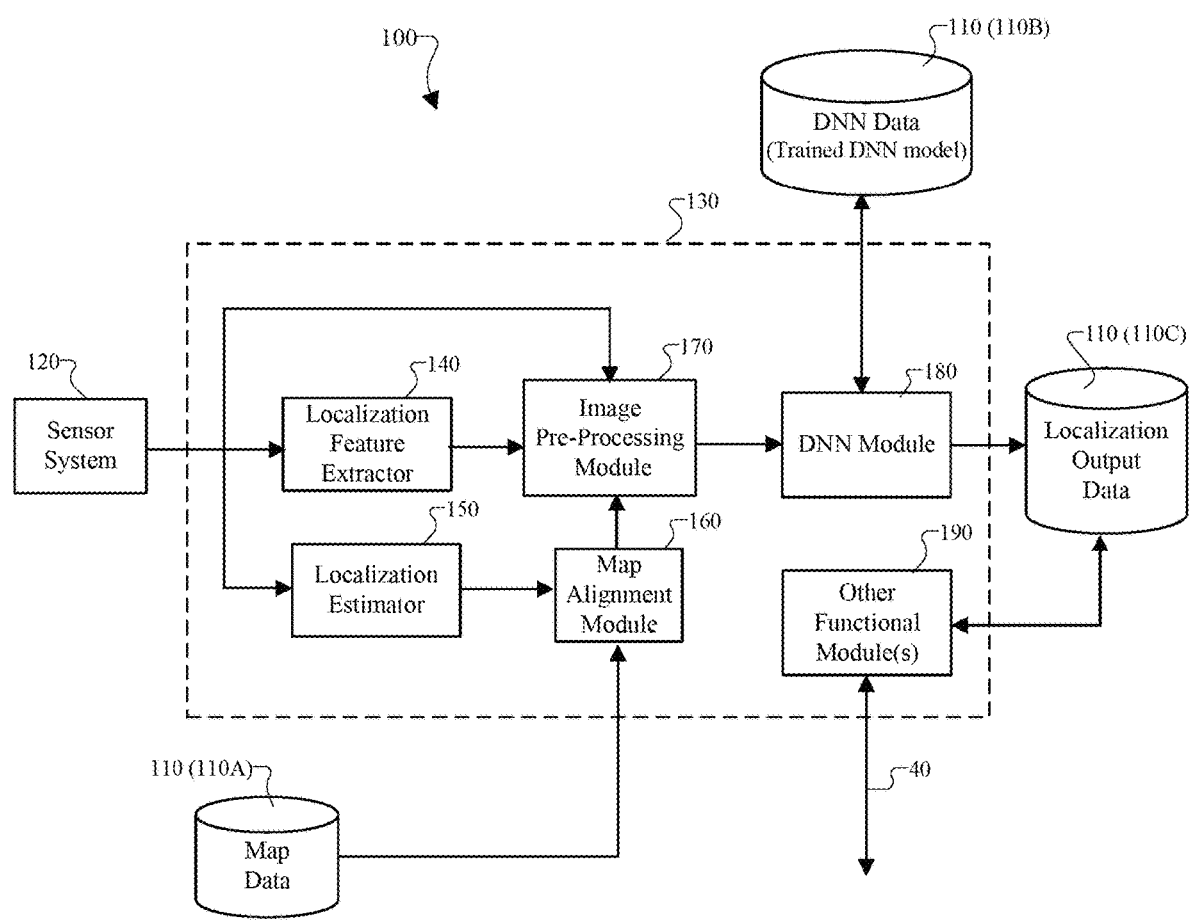
FIG. 2A is a diagram of a localization system according to an example embodiment of this disclosure.

In an example embodiment, the system 100 includes communication technology and/or network technology, which enables various communications among components, as shown in FIGS. 1-2A. In an example embodiment, for instance, the vehicle 10 and/or the system 100 includes control area network (CAN) technology, wired communication technology, wireless communication technology, any suitable networking technology, or any combination thereof to enable the components to communicate with each other. Also, in an example embodiment, the vehicle 10 and/or system 100 includes communication technology, which enables the vehicle 10 and/or system 100 to communicate with at least one other communication system (e.g., vehicle-to-infrastructure communication, vehicle-to-vehicle communication, etc.). In an example embodiment, the system 100 and its components are local to the vehicle 10. Alternatively, in another example embodiment, the system 100 includes one or more components, which are remote to the vehicle 10 while also being communicatively connected to one or more components that are local to the vehicle 10. Additionally or alternatively, the system 100 is configured to include one or more other components, which are not specifically mentioned herein, provided that the system 100 is configured to provide the functions described herein.

In FIG. 1, the system 100 is advantageously applied to the vehicle 10. However, the system 100 is not limited to vehicular applications, but is also applicable to various other applications. In this regard, the system 100 is beneficial to various applications and/or systems that rely on location data, orientation data, and/or localization data. For example, the system 100 is applicable to any mobile device, machine (e.g., robotics), or any suitable system.

FIG. 2A is a diagram of the system 100 according to an example embodiment. In FIG. 2A, the system 100 is an independent or a stand-alone localization system. However, the system 100 is not limited to this particular configuration, but is also applicable and/or scalable to other configurations. As an example, for instance, the system 100 is applicable as a sub-system within a broader or larger localization system. More specifically, in such an example, the larger localization system (not shown) includes various localization sub-systems, such as the system 100 and at least one other type of localization system, and further includes an optimizer that provides localization output data by optimizing the sub-system data of these sub-systems. In this regard, the system 100 is advantageous in its scalability.

In an example embodiment, the system 100 includes a processing system 130. In an example embodiment, the processing system 130 includes one or more processors, which are electrical, electronic, computer, or any combination thereof. In this regard, the one or more processors are hardware devices. In an example embodiment, the processing system 130 includes at least one central processing unit (CPU), graphics processing unit (GPU), any suitable processing device, or any combination thereof. In an example embodiment, the processing system 130 includes logic circuitry, suitable hardware computing components, suitable software computing components, or any combination thereof. In an example embodiment, the processing system 130 includes one or more modules, which include electrical components, electronic components, computer components, software components, or any combination thereof. For example, in FIG. 2A, the processing system 130 comprises a plurality of modules including a localization feature extractor 140, a localization estimator 150, a map alignment module 160, an image pre-processing module 170, a deep neural network (DNN) module 180, and a functional module 190 (e.g. at least a communication module 190). Alternatively, the system 100 and/or processing system 130 includes more modules or fewer modules than that shown in FIG. 2A provided that the system 100 is operable to provide the functions described herein.

In an example embodiment, the localization feature extractor 140 is communicatively connected to the sensor system 120. The localization feature extractor 140 is configured to receive sensor data from the sensor system 120. The localization feature extractor 140 is configured to identify and extract a set of localization features from the sensor data. In this regard, for instance, a localization feature includes at least any noteworthy or distinctive feature, which is detectable by the sensor system 120. In an example embodiment, the localization feature extractor 140 is configured to extract any suitable localization feature, which is identified as a possible location marker and which will most likely have a counterpart or a corresponding map feature within the map data. In this regard, the localization feature extractor 140 selectively extracts suitable detections or features from the sensor data and does not extract unsuitable detections or features (e.g., people, animals, other vehicles, etc.) from the sensor data. In many cases, the localization feature extractor 140 extracts stationary objects. Non-limiting examples of localization features include detections of poles, traffic lights, lane markers, curbs, barriers, medians, buildings, trees, signs, bridges, rails, various structures, other suitable entities, or any combination thereof.

In an example embodiment, the localization estimator 150 is configured to generate at least a localization estimate for a predetermined entity, such as the vehicle 10. In an example embodiment, the localization estimate includes at least location data, orientation data, other localization metrics (e.g., velocity, acceleration, etc.), or any combination thereof. For example, the localization estimate relates to a position of the entity and includes at least a longitudinal coordinate value, a latitude coordinate value, a height value, an orientation value, or any combination thereof. In an example embodiment, as shown in FIGS. 1-2A, the localization estimator 150 is configured to generate this localization estimate for the vehicle 10 based on sensor data from a set of one or more sensors 20 of the sensor system 120. In this case, for instance, the localization estimator 150 is configured to generate the localization estimate based on a first selection of sensor data, which includes GPS data, previous location data, odometer data, other sensor data, other relevant data, or any combination thereof.

In an example embodiment, the map alignment module 160 is configured to obtain the localization estimate. Upon receiving the localization estimate, the map alignment module 160 is configured to use this localization estimate to obtain a map region, which includes the localization estimate and thus a section of map data in which the entity (e.g., vehicle 10) is located. For example, in FIG. 2A, the map alignment module 160 is configured to align the map region such that the localization estimate is positioned at a predetermined area of the map region. In an example embodiment, the predetermined area is at a center portion or at the center of the map region. Alternatively, the predetermined area is located at another portion of the map region.

In an example embodiment, the image pre-processing module 170 is configured to process various data such that the DNN module 180 is, provided with suitable inputs for processing with the trained DNN model. In an example embodiment, for instance, the image pre-processing module 170 is configured to ensure that the DNN input data (e.g., map images and visualization images) comprise the same format or compatible formats. In this regard, the image pre-processing module 170 is configured to ensure that the DNN input data (e.g., map images, sensor images, and visualization images) are transformed and presented in the same coordinate system. For example, the image pre-processing module 170 is configured to generate the various images in any suitable form and/or view (e.g., x-cross sectional view, y-cross-sectional view, or a cross section based on any suitable plane). Also, the image pre-processing module 170 is configured to combine various views (e.g. a plurality of different cross-sectional views) to provide a more comprehensive view (e.g., 3D view) for localizing the entity than that provided by a single view (e.g., 2D view).

In FIG. 2A, for example, the image pre-processing module 170 is configured to generate two-dimensional (2D) top-views of map images and visualization images. More specifically, in response to receiving map data of a map region, which is selected and aligned based on the localization estimate, the image pre-processing module 170 is configured to convert, render, or generate this map data into a 2D top-view of the map region. Also, as shown in FIG. 2A, responsive to receiving sensor data and/or sets of localization features, the image pre-processing module 170 is configured to generate one or more visualization images that comprise 2D top-views of the respective sensor data and/or sets of localization features.

In an example embodiment, the DNN module 180 is configured to process inputs in accordance with a trained neural network model and provide localization output data based on the generation of localization update data. In this regard, for example, the DNN module 180 is configured to obtain and/or receive at least visualization images, map images, and the localization estimate. Also, if deemed necessary, the DNN module 180 is configured to obtain other relevant data (e.g., sensor data, map data, etc.), which relates to the DNN processing of these inputs. In an example embodiment, upon receiving these inputs, the DNN module 180 is configured to employ at least one trained DNN model. In this case, the DNN module 180 includes at least a DNN architecture, trained weights, and an inference engine implementation.

Figure 2B:
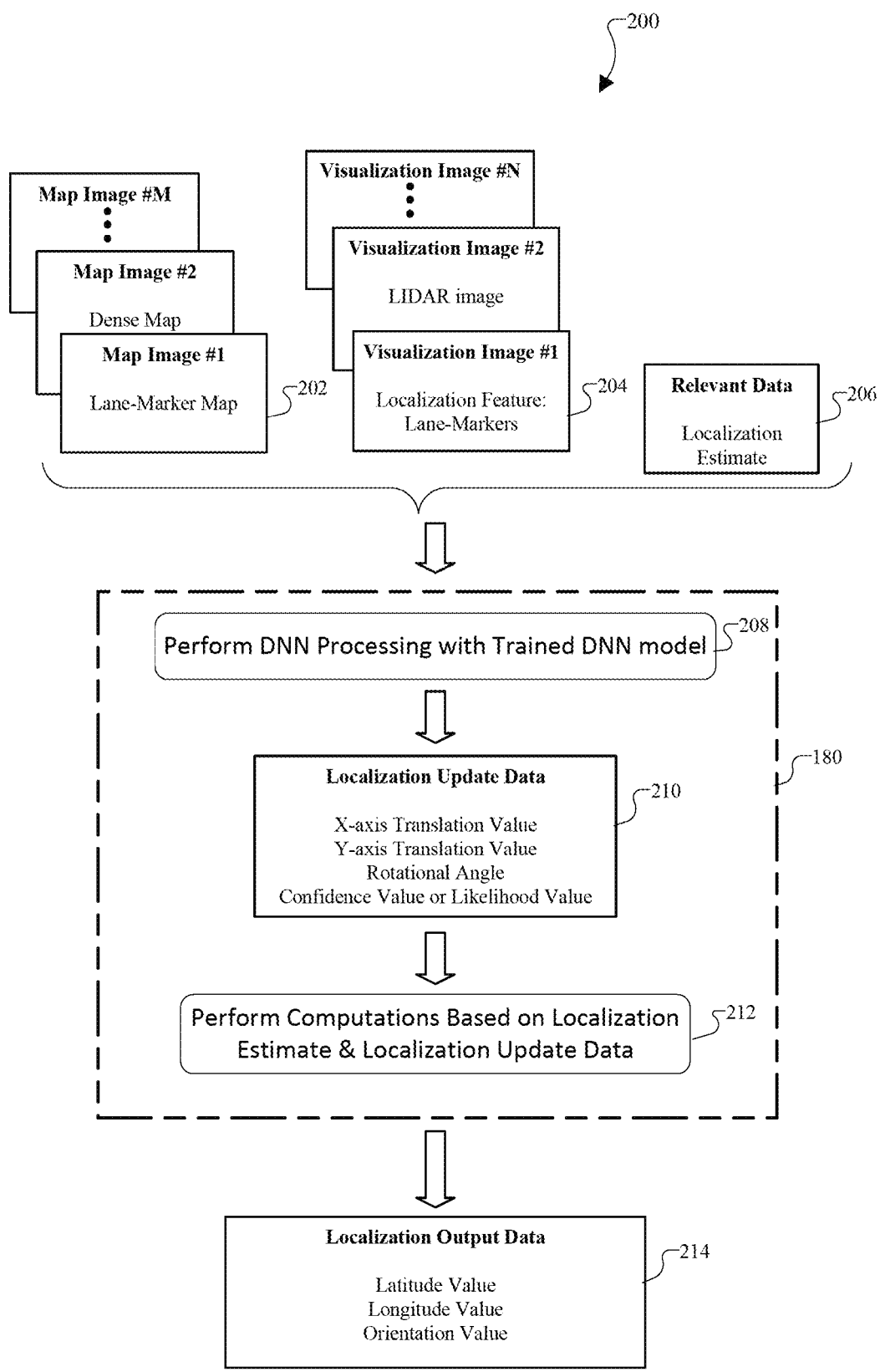
FIG. 2B illustrates a conceptual diagram of a process involved in generating the localization output data according to an example embodiment of this disclosure.

FIG. 2B illustrates a conceptual diagram of a process 200 involved in generating the localization output data via the DNN module 180. As aforementioned, the DNN module 180 is configured to receive one or more map images 202 (e.g., map image #1 or map images #1 to #M where M represents an integer number greater than 1), one or more visualization images 204 (e.g., visualization image #1 or visualization images #1 to #N where N represents an integer number greater than 1), and other relevant data 206 (e.g., localization estimate). Upon receiving this DNN input data, the DNN module 180 is configured to perform DNN processing (at segment 208) with the trained DNN model to optimize image registration among the various images and generate localization update data (at segment 210). In an example embodiment, the localization update data includes at least offset data between (i) positions of the various images before image registration and (ii) positions of the various images after image registration. For example, when the various images are rendered as 2D top view images, the offset data includes at least a first translation value (e.g., x-axis value), a second translation value (e.g., y-axis value), and a rotational value, for example, with respect to a position of the map image before image registration and a position of the map image after image registration. In an example embodiment, for instance, the offset data is based on pixels or pixel data in accordance with the image registration and is later translated into the appropriate metric units for calculating the localization output data, which includes at least a location and orientation of the vehicle 10. In addition, the localization update data includes at least one confidence value or a confidence level (or likelihood value) in association with the offset data. In an example embodiment, for instance, the DNN module 180 generates localization update data (at segment 210) that includes offset data (e.g., x-axis translation value, y-axis translation value, and a rotational translation value) along with a corresponding confidence value.

In an example embodiment, the DNN module 180 is configured to regress and/or classify any identified offset data. For example, when configured to implement at least direct regression, the DNN module 180 is configured to generate a set of offset values (e.g., x-axis translation value, y-axis translation value, and rotational angle value) along with a confidence value for that set of offset values. In this regard, the DNN module 180 generates the following localization update data: x-axis translation value, y-axis translation value, a rotational angle value, and a confidence value. Upon generating the localization update data, the DNN module 180 is configured to perform computations (at segment 212) to generate the localization output data (at segment 214) based on this localization update data and the localization estimate.

When configured to implement at least a classification-based system, the DNN module 180 is configured to generate a range of offset values along with corresponding likelihood values. For example, the DNN module 180 is configured to generate a first range of offset values taken along a first axis (e.g., x-axis) along with corresponding likelihood values for these offset values so that each offset value has a corresponding likelihood value. In addition, the DNN module 180 is configured to generate a second range of offset values taken along a second axis (e.g., y-axis) along with corresponding likelihood values for these offset values so that each offset value has a corresponding likelihood value. Also, the DNN module 180 is configured to generate a third range of offset values that indicate rotational angles along with corresponding likelihood values for these offset values so that each offset value has a corresponding likelihood value. In this regard, for each range of offset values, the DNN module 180 is configured to select one offset value within that range based on the likelihood value. As an example, for instance, the DNN module 180 is configured to select an x-axis offset value from a first range of x-axis offset values, which has the greatest corresponding likelihood value among the likelihood values for that first range of offset values. Upon generating the localization update data, the DNN module 180 is configured to perform computations (at segment 212) to generate the localization output data (at segment 214) based on this localization update data and the localization estimate.

Although FIGS. 2A-2B relate to the DNN module 180 employing the trained DNN model, the processing system 130 is not limited to this type of component, but is configured to include any suitable artificial intelligence system or machine-learning technology, which is configured to provide a dynamic framework that is operable to provide the functionality described herein based on the various images in real-time. Furthermore, while real-time implementations are used for running the localization in the vehicle 10, the system 100 is applicable with larger trained neural network models and/or iterative approaches for increased accuracy.

Furthermore, in FIG. 2A, the processing system 130 is configured to communicate with the sensor system 120. As described above, the sensor system 120 includes a plurality of sensors 20. In an example embodiment, the processing system 130 is configured to communicate with a first set of sensors 20 to provide a first selection of sensor data. In an example embodiment, the first set of sensors 20 provide the localization estimate. In an example embodiment, the first set of sensors 20 include a satellite-based system (e.g., GPS system), a wheel odometer, a camera odometer, any suitable sensor, or any combination thereof. In this regard, the localization estimate is based on GPS data and odometer-based data and/or other localization approaches.

Also, in FIG. 2A, the processing system 130 is configured to communicate with a second set of sensors 20 to provide a second selection of sensor data. In an example embodiment, the second set of sensors 20 include various types of sensors 20. For example, the second set of sensors 20 includes a camera system, a LIDAR system, a radar system, an ultrasonic system, an infrared system, the first set of sensors, any suitable sensor system, or any combination thereof. In this regard, the second set of sensors 20 is configured to generate localization update data, which is used to fine-tune or confirm the localization estimate.

As aforementioned, the first set of sensors 20 is configured to generate the localization estimate such that a map region concerning the entity (e.g., the vehicle 10) is located and processed in real-time without requiring the costs associated with a trained DNN model to do so. That is, the first set of sensors 20 provides the localization estimate that selects and aligns the map region of the map data, while the second set of sensors 20 is generally more precise and provides localization update data for the vehicle 10 within the map region, thereby enabling the processing system 130 to generate localization output data with high accuracy in real-time. In an example embodiment, the first set of sensors and the second set of sensors include no overlap or include at least some overlap.

In an example embodiment, the processing system 130 is configured to communicate with at least one non-transitory computer readable medium 110, which includes at least computer readable medium portion 110A, computer readable medium portion 110B, and computer readable medium portion 110C. In this regard, the computer readable medium portion 110A, the computer readable medium portion 110B, and the computer readable medium portion 110C refer to portions of (i) the computer readable medium 110 or (ii) a plurality of computer readable mediums 110. More specifically, referring to FIG. 2A, for example, the computer readable medium portion 110A includes at least map data. In an example embodiment, the map data includes various, high-definition map information concerning various geographic zones or regions. In an example embodiment, the map data includes various electronic maps, digital maps, computerized maps, or any combination thereof. In an example embodiment, the map data includes at least topological information (e.g., roads, lanes, etc.), high-level feature information (e.g., lane markers, signs, traffic lights, etc.), mid-level feature information (e.g., poles, various structures, etc.), and/or low-level feature information (e.g., dense point clouds, reflectivity levels, etc.). In this regard, when with a greater level of map details and map features, the processing system 130 is configured to provide localization output data with a greater level of accuracy compared to when a lesser level of map details and map features are provided.

In an example embodiment, the computer readable medium portion 110B includes machine-learning data, such as neural network data which includes at least a DNN architecture and corresponding weights. In an example embodiment, as shown in FIG. 2A, for instance, the neural network data comprises DNN data, which includes the trained DNN model. In an example embodiment, the DNN model is trained to generate localization update data by optimizing at least image registration based on various images (e.g., map images and visualization images), which are generated by the processing system 130. In an example embodiment, the DNN framework for the trained DNN model is relatively complex and dynamic. In this regard, for example, the DNN processing with the trained DNN model is configured to vary depending upon dynamic factors, such as (i) a time at which the input was processed, (ii) other inputs that were previously processed, or (iii) any combination thereof.

In an example embodiment, prior to being stored in computer readable medium portion 110B, the DNN model is trained off-line, via a remote computer system with at least one processing device, with a relatively large collection of training data. In this regard, the remote computer system trains the DNN model with a suitable and sufficient amount of training data such that when the processing system 130, associated with the entity (e.g., vehicle 10), employs the trained DNN model, the processing system 130 is configured to generate localization output data for the entity with high-accuracy and precision. In an example embodiment, the collection of training data includes collected data that is gathered over various periods of times (e.g., several years). In an example embodiment, the DNN model is trained with various sensor data, such as a sub-set or super-sect of sensor data from one or more of a camera system, a radar system, a LI DAR system, an ultrasonic system, a satellite-based system, an infrared sensor, any odometer-based system, any suitable sensor system, or any combination thereof. In an example embodiment, the DNN model is trained with at least sensor data, which is obtained from at least similar types or the same types of sensors 20, which are associated with the vehicle 10.

In an example embodiment, during training, the remote computer system is configured to extract localization features from the sensor data. Also, during training, the remote computer system is also configured to generate a localization estimate from sensor data taken from a selection of sensors, which includes a satellite-based system (e.g., GPS sensor system), a wheel odometer, a camera odometer, any suitable sensor, or any combination thereof. Additionally, the trained DNN model is configured to be trained with high accuracy localization output data, which includes at least (i) localization output data based on sensor data from differential GPS sensors coupled with odometer information, (ii) localization output data from other types of localization systems, (iii) other precise location data, which may be calculated offline (e.g., outside a vehicle after driving). Furthermore, the remote computer system provides the trained DNN model, which is employable by the processing system 130 and which is also configured to be fine-tuned with on-line training via the processing system 130.

Figure 3:
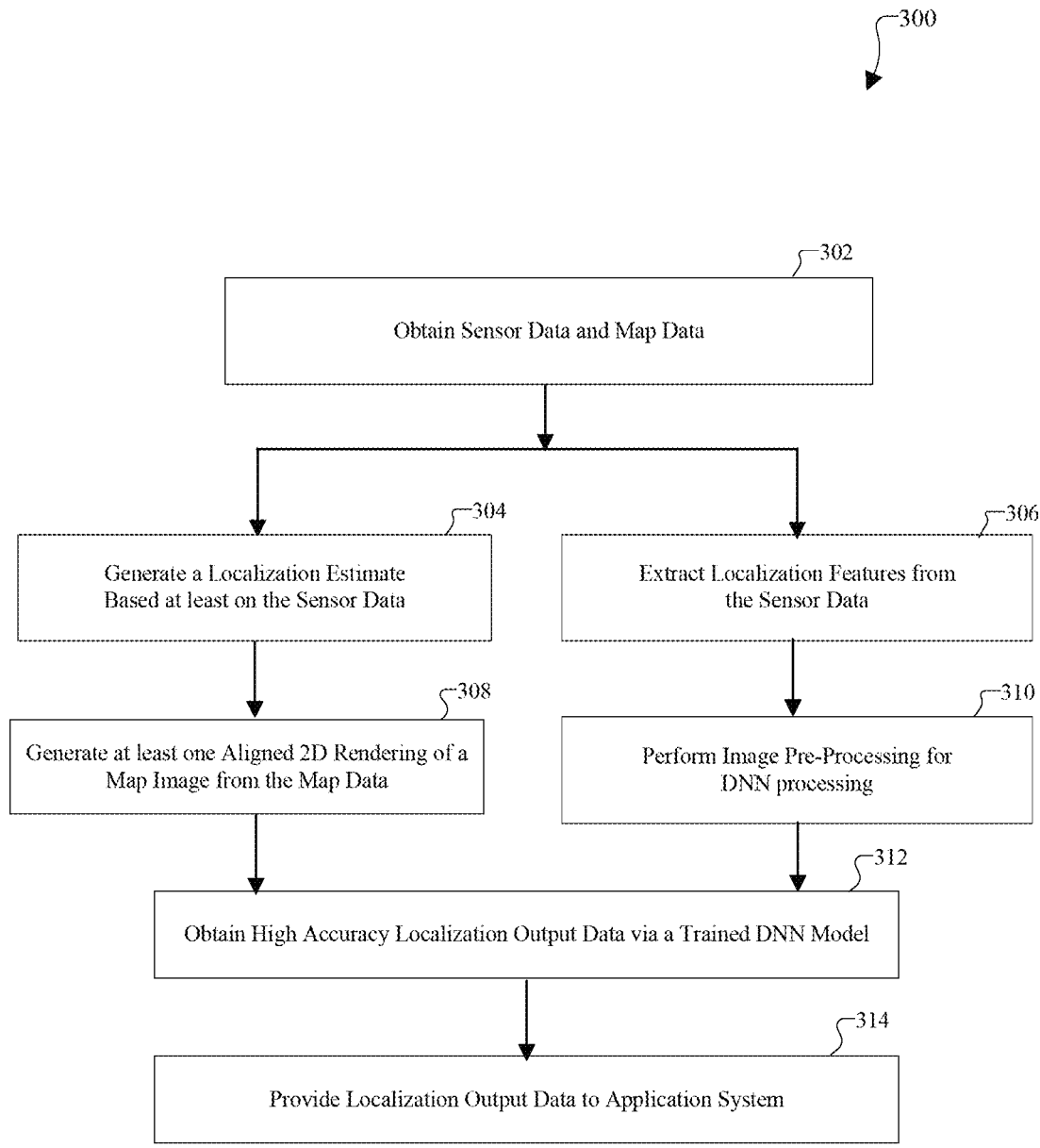
FIG. 3 is a conceptual flow chart of a method for localizing an entity according to an example embodiment of this disclosure.

FIG. 3 is a flow chart that illustrates a method 300 for at least localizing an entity according to an example embodiment. In this regard, the method 300 is executable by any suitable hardware technology, software technology, or any combination of hardware and software technology. More specifically, as shown in FIGS. 2A-3, for instance, the method 300 is implemented by the system 100, particularly the processing system 130, which comprises hardware and/or software implementations of a plurality of modules that include the localization feature extractor 140, the localization estimator 150, the map alignment module 160, the image pre-processing module 170, the DNN module 180, and the communication module 190.

At step 302, in an example embodiment, the processing system 130 is configured to obtain sensor data and map data, respectively. For example, as discussed with respect to FIG. 2A, the processing system 130 receives the sensor data from the sensor system 120. Also, as shown in FIG. 2A, the processing system 130 receives the map data from the computer readable medium portion 110A. The processing system is configured to receive the sensor data and the map data simultaneously or at different times. Upon receiving the sensor data (or the sensor data and the map data), the processing system 130 proceeds to step 304. Also, upon receiving the sensor data in real-time, the processing system 130 proceeds to step 306. In an example embodiment, the processing system 130 is configured to perform step 304 and step 306 simultaneously or at different times.

At step 304, in an example embodiment, the processing system 130 is configured to generate a localization estimate based on the sensor data. For example, as discussed with respect to FIG. 2A, the localization estimator 150 is configured to generate a localization estimate based on a first selection of sensor data from the first set of sensors 20. In an example embodiment, the localization estimator 150 is configured to provide the localization estimate, for instance, from satellite-based system data (e.g., GPS data), other sensor data (e.g., wheel odometer data, camera odometer data, and/or any suitable sensor data), or any combination thereof via other localization approaches. In an example embodiment, upon generating the localization estimate, the processing system 130 is configured to perform step 308.

At step 306, in an example embodiment, the processing system 130 is configured to extract localization features from the sensor data. For example, as discussed with respect to FIG. 2A, the localization feature extractor 140 is configured to identify and extract localization features from at least the second selection of sensor data from the second set of sensors 20. Non-limiting examples of localization features include detections of poles, traffic lights, lane markers, curbs, barriers, medians, buildings, trees, signs, bridges, rails, various structures, other suitable entities, or any combination thereof. In an example embodiment, upon extracting one or more sets of localization features from the sensor data, the processing system 130 is configured to perform step 310.

At step 308, in an example embodiment, the processing system 130 is configured to generate at least one aligned 2D rendering of map data. In this case, each 2D rendering is provided as a 2D top-view map image. For example, as discussed with respect to FIG. 2A, the map alignment module 160 is configured to generate at least one rendering (e.g., a 2D rendering of a map region), which is aligned based on the localization estimate and which is suitable for processing with other data (e.g., visualization images of step 310) via the trained neural network model of step 312. In an example embodiment, upon ensuring that the map image is presented in a suitable format (e.g., 2D top-view rendering) for processing via the trained DNN model, the processing system 130 is configured to perform step 312.

At step 310, in an example embodiment, the processing system 130 is configured to perform image pre-processing, if deemed appropriate or necessary, to prepare the localization features, as well as any sensor data, for processing with the trained neural network model. For example, as discussed with respect to FIG. 2A, the image pre-processing module 170 is configured to generate, render, or convert one or more sets of localization features into one or more visualization images. Also, if deemed appropriate or necessary, the image pre-processing module 170 is configured to ensure that the localization features and/or visualization features are compatible with and/or provided in a suitable format for processing with the trained DNN model. In an example embodiment, upon ensuring that the localization features are presented in a suitable format (e.g., 2D rendering), the processing system 130 is configured to perform step 312.

At step 312, in an example embodiment, the processing system 130 is configured to generate high accuracy localization output data by means of the stored DNN architecture and corresponding weights. For example, as discussed with respect to FIG. 2A, upon obtaining one or more visualization images and map images, the DNN module 180 is configured to generate localization output data based at least on the localization estimate and localization update data, which is provided via the trained DNN model. More specifically, with the trained DNN model, the DNN module 180 is configured to determine any discrepancy between the aligned rending of the map image based on the localization estimate and the various generated images (e.g., sensor images, visualization images, etc.). Also, by utilizing the trained DNN model, the DNN module 180 is configured to optimize the registration of the various images (e.g., visualization images, map images, etc.), which are input into the processing system 130 such that one or more of the map images and the visualization images are aligned. In this regard, the processing system 130 directly yields highly accurate localization update data, for example, based on this discrepancy or offset data between (i) a position of the map image prior to image registration (e.g., a position based on the initial map alignment based on the localization estimate) and (ii) a position of the map image after image registration (e.g., a position based on the optimized and transformed map image via image registration). The processing system 130 is configured to perform step 312 in real-time and/or iteratively. In an example embodiment, upon generating the localization output data, the processing system 130 is configured to perform step 314.

Also, at step 312, in an example embodiment, the processing system 130 is configured to generate confidence output data. In an example embodiment, the confidence output data includes at least a confidence value, which provides a quantifiable assurance of reliability of the localization output data based on the current input. In this regard, for example, if there aren't enough map features or localization features to perform the image registration reliably, then the processing system 130 generates a low confidence value. Also, if the images are very different from those of the training set used during training, then the confidence value will be lower compared to that in which the images are similar to those of the training set. By providing the confidence value together with the localization output data, the processing system 130 is configured to provide a confidence assessment to the application system 30 regarding the localization output data. Also, by generating different probabilities, the processing system 130 is configured to provide an estimate of an amount of variance in the localization update data and/or the localization output data. Moreover, this feature is advantageous in enabling the application system 30 to adapt to the level of accuracy, for example, by relying on the current localization output data when the confidence value is equal to or exceeds a predetermined value and relying on other data (e.g., location-based extrapolations from previous localization output data with high confidence values) when the confidence value is less than the predetermined value.

At step 314, in an example embodiment, the processing system 130 is configured to provide the localization output data to at least one application system 30. For example, as discussed with respect to FIG. 2A, the communication module 190 is configured to transmit the localization output data to at least one application system 30 via the communication link 40, which may be wired or wireless. In this regard, the processing system 130 is configured to provide the localization output data to the application system 30 such that the localization output data contributes to route planning, navigation, motion control, or any suitable localization-based application.

Figure 4A:
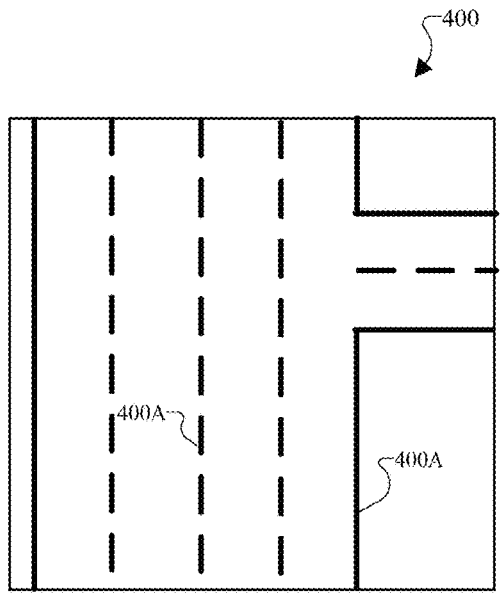
FIG. 4A is a non-limiting example of a map image according to an example embodiment of this disclosure.
Figure 4B:
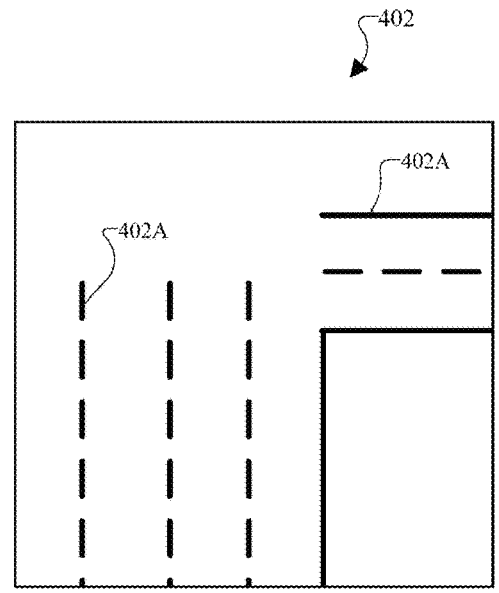
FIG. 4B is a non-limiting example of a visualization image that comprises detections of lane-markings according to an example embodiment of this disclosure.
Figure 4C:
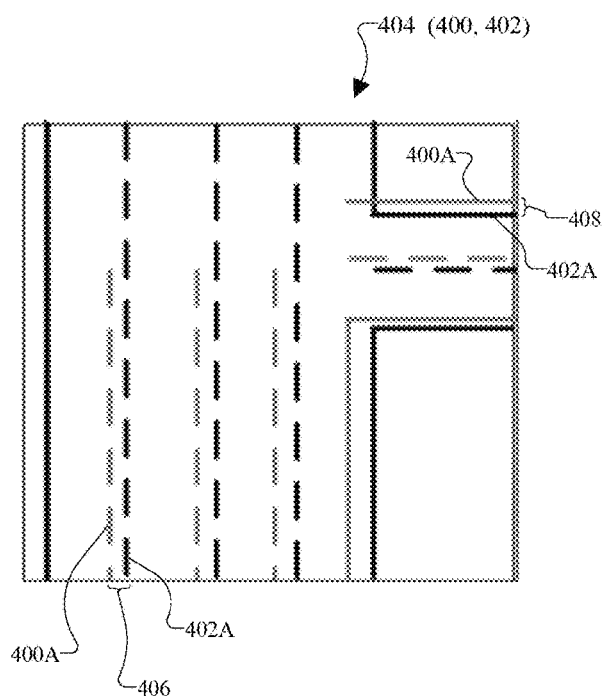
FIG. 4C is a non-limiting example of a superimposition of the map image of FIG. 4A relative to the visualization image of FIG. 4B prior to optimizing image registration according to an example embodiment of this disclosure.

FIGS. 4A-4D illustrate non-limiting examples of various 2D top-view images, which are generated and analyzed by the processing system 130 according to an example embodiment. More specifically, FIG. 4A illustrates a non-limiting example of a map image 400, which shows a map region that is aligned based on a localization estimate, as determined from a first selection of sensor data from the sensor system 120. As shown in FIG. 4A, the map image 400 includes map features, such as lane-markings 400A. In addition, FIG. 4B illustrates a non-limiting example of a visualization image 402, which includes a set of localization features, such as detections of lane-markings 402A, as determined from a second selection of sensor data from the sensor system 120. Moreover, since the lane-markings 402A are based on detections from sensor data, the lane-marking are not as clear and as complete as the lane-markings 400A of the map image of FIG. 4A. Meanwhile, FIG. 4C illustrates a superimposition 404 of the map image 400 relative to the visualization image 402. As shown in this non-limiting example of FIG. 4C, the map image 400 is not aligned with the visualization image 402. More specifically, the map image 400 is offset from the visualization image 402 by a first offset value 406 along an x-axis and a second offset value 408 along a y-axis (e.g. x-axis translation value and y-axis translation value). Also, in FIG. 4C, the map image 400 and the visualization image 402 are aligned along a rotational axis and thus include no rotational offset (e.g., rotational angle of zero degrees). In this regard, the processing system 130 is configured to identify and compute this offset data as localization update data to generate the localization update data with high accuracy.

Figure 4D:
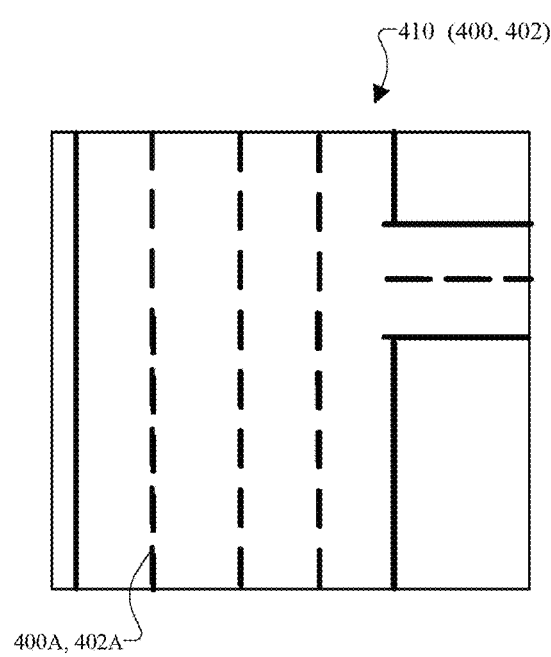
FIG. 4D is a non-limiting example of a superimposition of the map image of FIG. 4A relative to the visualization image of FIG. 4B after optimizing image registration according to an example embodiment of this disclosure.

In an example embodiment, the processing system 130 (e.g., the DNN module 180) is configured to employ the trained DNN model to optimize the registration of at least the map image 400 with the visualization image 402 in real-time. In this regard, FIG. 4D illustrates a non-limiting example of a representation 410 of an optimized registration of at least the map image 400 with the visualization image 402. As shown in FIG. 4D, when the map image 400 is optimally registered with the visualization image 402, the map features (e.g., lane-markings 400A) are aligned with the localization features (e.g., lane-markings 402A). In this case, the localization update data includes offset data, which indicates an offset between a position of the map image, as aligned via the localization estimate, relative to a position of the map image, as optimally registered via the trained DIN model. Advantageously, upon optimizing registration of the various images and determining the localization update data, the processing system 130 generates localization output data with high accuracy in real-time based on computations involving the localization estimate and the localization output data. In this regard, for example, the processing system 130 adjusts the localization estimate based on the offset data to provide the localization output data.

Figure 5A:
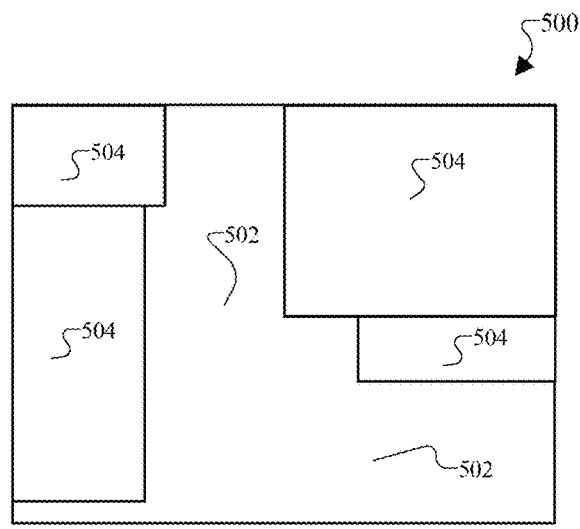
FIG. 5A is a non-limiting example of a map image according to an example embodiment of this disclosure.
Figure 5B:
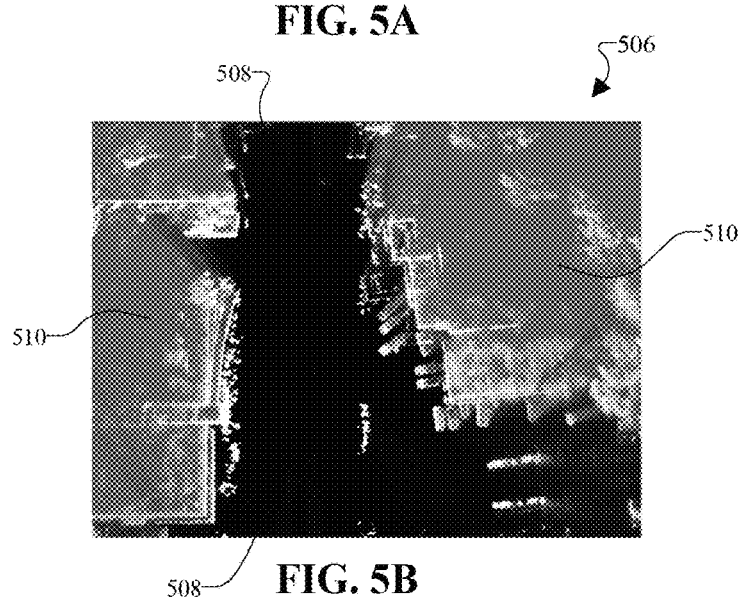
FIG. 5B is a non-limiting example of a visualization image that comprises an occupancy map according to an example embodiment of this disclosure.
Figure 5C:
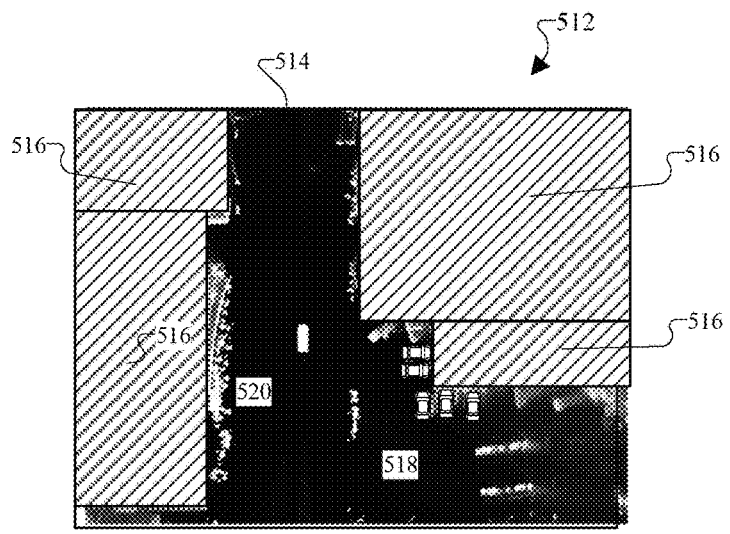
FIG. 5C is a non-limiting example of a visualization image that comprises the occupancy map of FIG. 5B together with semantic data according to an example embodiment of this disclosure.

FIGS. 5A-5C illustrate non-limiting examples of various 2D top-view images, which are generated and analyzed by the processing system 130 according to an example embodiment. For example, FIG. 5A illustrates a non-limiting example of a map image 500 with various map features, which include at least drivable space 502 and buildings 504. In addition, FIG. 5B illustrates a non-limiting example of a visualization image 506, which comprises a dense point cloud image. As shown in FIG. 5B, this visualization image 506 shows a detection of a pathway 508 along with detections of various objects 510 (e.g., buildings, poles, and other types of objects). Meanwhile, FIG. 5C illustrates a non-limiting example of a visualization image 512, which includes the visualization image 506 of FIG. 5B together with semantic data. For example, the semantic data includes various indicators for the various objects. In FIG. 5C, for instance, the objects are identifiable via at least the following indicators: (i) a first indicator 514 to indicate drivable space, (ii) a second indicator 516 (e.g. hatching) to indicate a building, (ii) a third indicator 518 (e.g., vehicle symbol) to indicate another vehicle, and (iii) a fourth indicator 520 (e.g., another vehicle symbol) to indicate a location the vehicle 10 itself based on the positions of the sensors 20 relative to the vehicle 10. In this regard, the inclusion of semantic data is beneficial, for instance, in identifying other detections, such as mobile objects (e.g., vehicles as indicated by the third indicator 518), such that the processing system 130 is aware of the non-static nature of these mobile objects and adapts the extraction of localization features and/or the image registration based on this awareness. In this example, the visualization image 512 of FIG. 5C is generated for registration with at least (i) the map image 500 of FIG. 5A and (ii) the visualization image 506 of FIG. 5B via the processing system 130. In this regard, FIGS. 5A-5C illustrate three non-limiting examples of various images that the processing system 130 is configured to generate and analyze in order to provide localization output data via the trained DNN model.

Figure 6A:
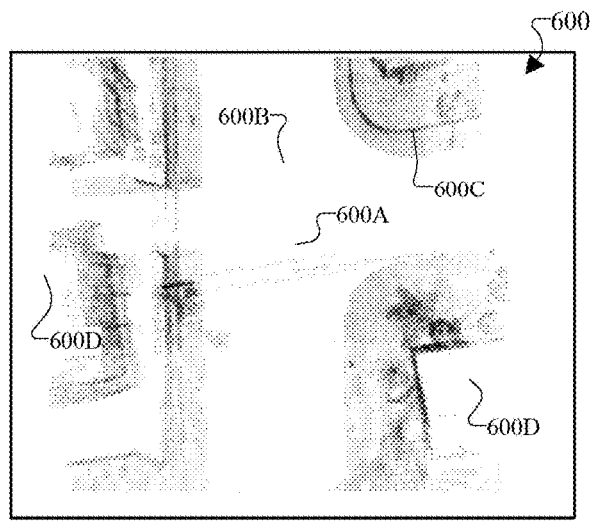
FIG. 6A is a non-limiting example of a map image according to an example embodiment of this disclosure.
Figure 6B:
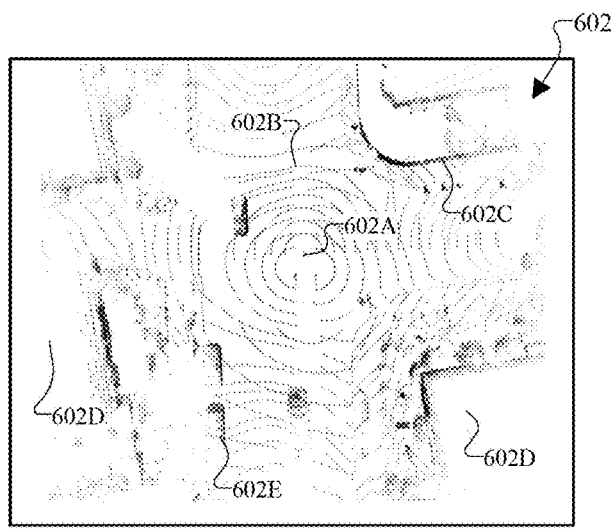
FIG. 6B is a non-limiting example of a visualization image based on sensor data according to an example embodiment of this disclosure.
Figure 6C:
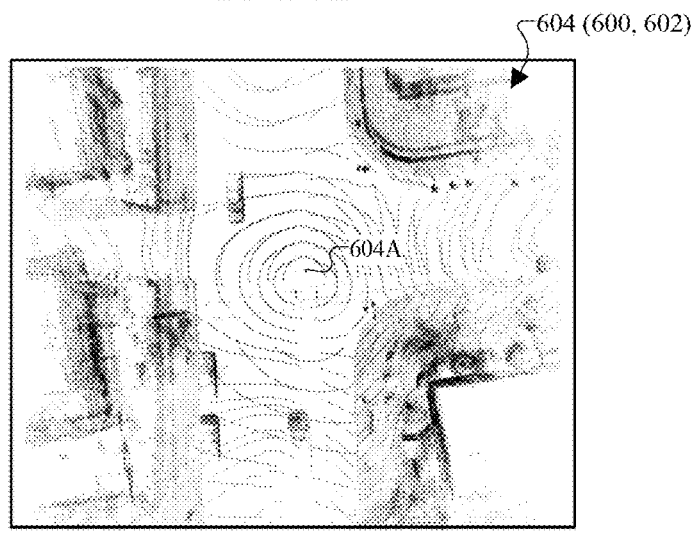
FIG. 6C is a non-limiting example of a superimposition of the map image of FIG. 6A relative to the visualization image of FIG. 6B prior to optimizing image registration according to an example embodiment of this disclosure.

FIGS. 6A-6C illustrate non-limiting examples of various 2D top-view images, which are generated and analyzed by the processing system 130 according to an example embodiment. More specifically, FIG. 6A illustrates a non-limiting example of a map image 600, which shows a map region that is aligned based on a localization estimate 600A, as determined from a first selection of sensor data from the sensor system 120. As shown in FIG. 6A, the map image 600 includes map features, such as a driving lane 600B, curbs 600C, and buildings 600D. In addition, FIG. 6B illustrates a non-limiting example of a visualization image 602, which includes a location of the vehicle 10 according to the localization estimate 602A, which is based on at least one location of at, least, one sensor 20 relative to the vehicle 10. More specifically, the visualization image 602 includes LIDAR detections of localization features, e.g. drivable space 602B, curbs 602C, buildings 602D, and vehicles 602E. Meanwhile, FIG. 6C illustrates a superimposition 604 of the map image 600 relative to the visualization image 602. More specifically, the superimposition 604 represents an instance after the processing system 130 has optimized registration between the map image 600 and the visualization image 602. In this regard, for example, this superimposition 604 also includes a representation of the localization output data 604A, which the processing system 130 is configured to generate based upon the localization estimate 602A and localization update data. Thus, by providing this localization output data 604A, the vehicle 10 is configured to be localized and navigated with high accuracy in real-time.

As discussed above, FIGS. 4A-4C, 5A-5C, and 6A-6B illustrate non-limiting examples of various images, which the processing system 130 is configured to generate prior to performing image registration while FIGS. 4D and 6C illustrate non-limiting examples of optimal image registration of these various images. In this regard, the system 100 is not limited to these types of visualization images and map images, but is configured to generate and handle any image that is appropriate for processing with the trained DNN model. For example, although not shown in the non-limiting examples of FIGS. 4A-4D and 5A-5C, there are no visualizations of pole detections or map images containing poles (as localization features or map features), although the use of poles as localization features is often reliable since poles are static objects in most cases and easy to detect with sensors 20.

As described herein, the system 100 provides a number of advantageous features, as well as benefits. For example, the system 100 is configured to provide localization output data with a high level of accuracy in real-time. Moreover, the system 100 is configured to localize and/or provide localization output data within a high definition map, which is beneficial in various applications, such as autonomous driving, semi-autonomous driving, route-planning, etc. In this regard, the system 100 is configured to generate localization output data in accordance with sensor data, which is obtained from various sensors 20 in real-time. Moreover, since the sensor system 120 includes a plurality of sensors 20, the system 100 is configured to provide localization output data even in a case in which one or more of the sensors 20 malfunctions and/or is inoperable by relying on at least one or more remaining operable sensors 20 of the sensor system 120. Also, the system 100 is advantageously configured to provide localization output data with high accuracy by taking into account real-time information, as provided by a variety of sensors 20.

More specifically, in this regard, for example, the system 100 is advantageously configured to employ the trained DNN model to compute localization update data to fine-tune the localization estimate via optimally registering at least one map image with visualization images based on sensor data. Furthermore, the system 100 is advantageously configured to provide the localization output data to at least one application system 30. For example, as non-limiting examples, the application system 30 includes a navigation system, a route-planning system, a motion control system, or any suitable technological system.

In addition, the system 100 is configured to automatically optimize the localization estimate by registering real-time detections (e.g., sets of localization features of the visualization images based on sensor data from sensor system) with map features of a localized map region. The system 100 is also advantageously configured to select and align detected features in the range/view of the vehicle 10 relative to map features of the map, e.g. when these features are determined to be detected in a correct or appropriate manner. Moreover, by employing the trained DNN model, the system 100 is configured to correct for misalignments due to inaccuracies or discrepancies between the localization estimate, as determined from the first selection of sensor data, and real-time detections, as determined from the second selection of sensor data. Moreover, by employing the trained DNN model, the system 100 is configured to perform registration and alignment of various images in real-time as the system 100 does not require a manual selection of alignment features. That is, the system 100 is configured to automatically select and extract localization features, thereby providing significant savings in terms of time and resources.

As aforementioned, the processing system 130 employs the trained deep convolutional neural network to optimize an alignment between at least one map image, which is aligned based on the localization estimate, and at least one visualization image. In this regard, the processing system 130 directly yields localization update data with high accuracy. Additionally, by employing the trained neural network, the processing system 130 is configured to determine and generate confidence output data for assessing and quantifying a confidence or assurance of the reliability of the trained DNN model's likely performance with respect to the localization output data. Advantageously, the processing system 130 is configured to run in real-time and generate the localization output data in a single shot or iteratively.

Also, the system 100 is combinable and/or scalable with other localization methods, systems, and technologies to provide localization output data with enhanced accuracy and precision. Moreover, the system 100 is configured to receive raw sensor data as input. The system 100 is configured to operate with various types of sensors 20 and various types of maps. In this regard, by including various types of sensors 20 and various types of maps, the system 100 is configured to provide localization output data with high-accuracy in real-time in various types of environments, conditions, and scenarios. As disclosed herein, the system 100 is configured to provide numerous benefits to various types of systems and applications, such as navigation, autonomous driving, semi-autonomous driving, any suitable technology, or any combination thereof.

That is the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer implemented method comprising:
    obtaining, via a processing system with at least one processing device, sensor data from a sensor system, the sensor data corresponding to a geographic region that includes a vehicle;
    generating, via the processing system, a localization estimate for the vehicle based on a first selection of sensor data;
    producing, via the processing system, one or more map images from high definition map data that includes one or more map features, each map image being a rendering of a mapping region that includes the localization estimate;
    extracting, via the processing system, one or more sets of localization features from a second selection of sensor data;
    generating, via the processing system, one or more visualization images, each visualization image including a respective set of localization features;
    generating, via the processing system, localization update data in real-time via a machine learning system that optimizes registration of the one or more map images relative to the one or more visualization images in response to receiving the one or more map images and the one or more visualization images as input;
    generating, via the processing system, localization output data based on the localization estimate and the localization update data; and
    providing, via the processing system, the localization output data to an application system relating to navigation of the vehicle.

2. The method of claim 1, wherein the machine learning system includes
    a trained deep neural network model to perform the step of generating the localization update data in real-time.

3. The method of claim 1, wherein:
    the first selection of sensor data is obtained from a first set of sensors of the sensor system; and
    the first set of sensors include at least a satellite-based system.

4. The method of claim 1, wherein:
    the second selection of sensor data is obtained from a second set of sensors of the sensor system; and
    the second set of sensors include at least a light detection and ranging (LIDAR) system, a radar system, or an ultrasonic sensor.

5. The method of claim 4, wherein the second set of sensors further include a camera system.

6. The method of claim 1, wherein the step of generating, via the processing system, localization update data in real-time via optimizing registration of the one or more map images relative to the one or more visualization images comprises:
optimizing alignment of the one or more map features of the one or more map images relative to the corresponding one or more sets of localization features of the one or more visualization images; and
computing offset data based on positions of the one or more map images (i) when aligned based on the localization estimate and (ii) when aligned with the one or more visualization images via the optimized registration.

7. The method of claim 1, wherein:
the step of producing each map image includes generating a two-dimensional top-view image of the map region that is rendered based on the localization estimate;
the step of generating the one or more visualization images includes producing the one or more visualization images as two-dimensional top-views of the one or more sets of localization features; and
each map image and each visualization image reside in the same coordinate system.

8. A system comprising:
a sensor system including a plurality of sensors to sense a geographic region of a vehicle;
a processing system communicatively connected to the sensor system, the processing system including at least one processing device, the processing system being configured to:
generate a localization estimate for the vehicle based on a first selection of sensor data from the sensor system;
produce one or more map images from high definition map data that includes one or more map features, each map image being a rendering of a mapping region that includes the localization estimate;
extract one or more sets of localization features from a second selection of sensor data from the sensor system;
generate one or more visualization images, each visualization image including a respective set of localization features;
generate localization update data in real-time via a machine learning system that optimizes registration of the one or more map images relative to the one or more visualization images in response to receiving the one or more map images and the one or more visualization images as input;
generate localization output data based on the localization estimate and the localization update data; and
provide the localization output data to an application system relating to navigation of the vehicle.

9. The system of claim 8, wherein the machine learning system includes a trained deep neural network model to generate the localization update data in real-time.

10. The system of claim 9, wherein a confidence level is generated in association with the localization update data.

11. The system of claim 8, wherein the first selection of sensor data is obtained from at least a satellite-based system.

12. The system of claim 8, wherein the second selection of sensor data is obtained from at least a light detection and ranging (LIDAR) system, a radar system, or an ultrasonic sensor.

13. The system of claim 8, wherein:
the processing system is configured to:
optimize alignment of the one or more map features of the one or more map images relative to the corresponding one or more sets of localization features of the one or more visualization images; and
compute offset data based on positions of the one or more map images (i) when aligned based on the localization estimate and (ii) when aligned with the one or more visualization images via the optimized registration.

14. The system of claim 8, wherein:
each map image includes a two-dimensional top-view image of the map region;
the one or more visualization images include two-dimensional top-views of the one or more sets of localization features; and
each map image and each visualization image reside in the same coordinate system.

15. The system of claim 8, wherein the second selection of sensor data is also obtained from at least a camera system.

16. A computer implemented method comprising:
producing, via a processing system with at least one processing device, one or more map images from high definition map data that includes one or more map features, each map image being a rendering of a mapping region that is aligned with a localization estimate based on a first selection of sensor data;
extracting, via the processing system, sets of localization features from a second selection of sensor data, the sets of localization features including at least a first set of localization features and a second set of localization features;
generating, via the processing system, visualization images including at least a first visualization image based on the first set of localization features and a second visualization image including the second set of localization features;
generating, via the processing system, localization update data in real-time via a machine learning system that optimizes registration of the one or more map images relative to the visualization images in response to receiving the one or more map images and the visualization images as input;
generating, via the processing system, localization output data based on the localization estimate and the localization update data; and
providing, via the processing system, the localization output data to an application system relating to navigation.

17. The computer implemented method of claim 16, wherein:
the second selection of sensor data is obtained from a second set of sensors of the sensor system; and
the second set of sensors include at least a light detection and ranging (LIDAR) system, a radar system, or an ultrasonic sensor.

18. The computer implemented method of claim 16, wherein the machine learning system includes
a trained deep neural network model to perform the step of generating the localization update data in real-time.

* * * * *